Sept. 2, 1969 F. REISFELD 3,465,321
DIFFERENTIAL AMPLIFIER AND PEAK DETECTOR FOR MULTIPLE SPEED MAGNETIC TAPE TRANSPORT
Filed Feb. 21, 1966
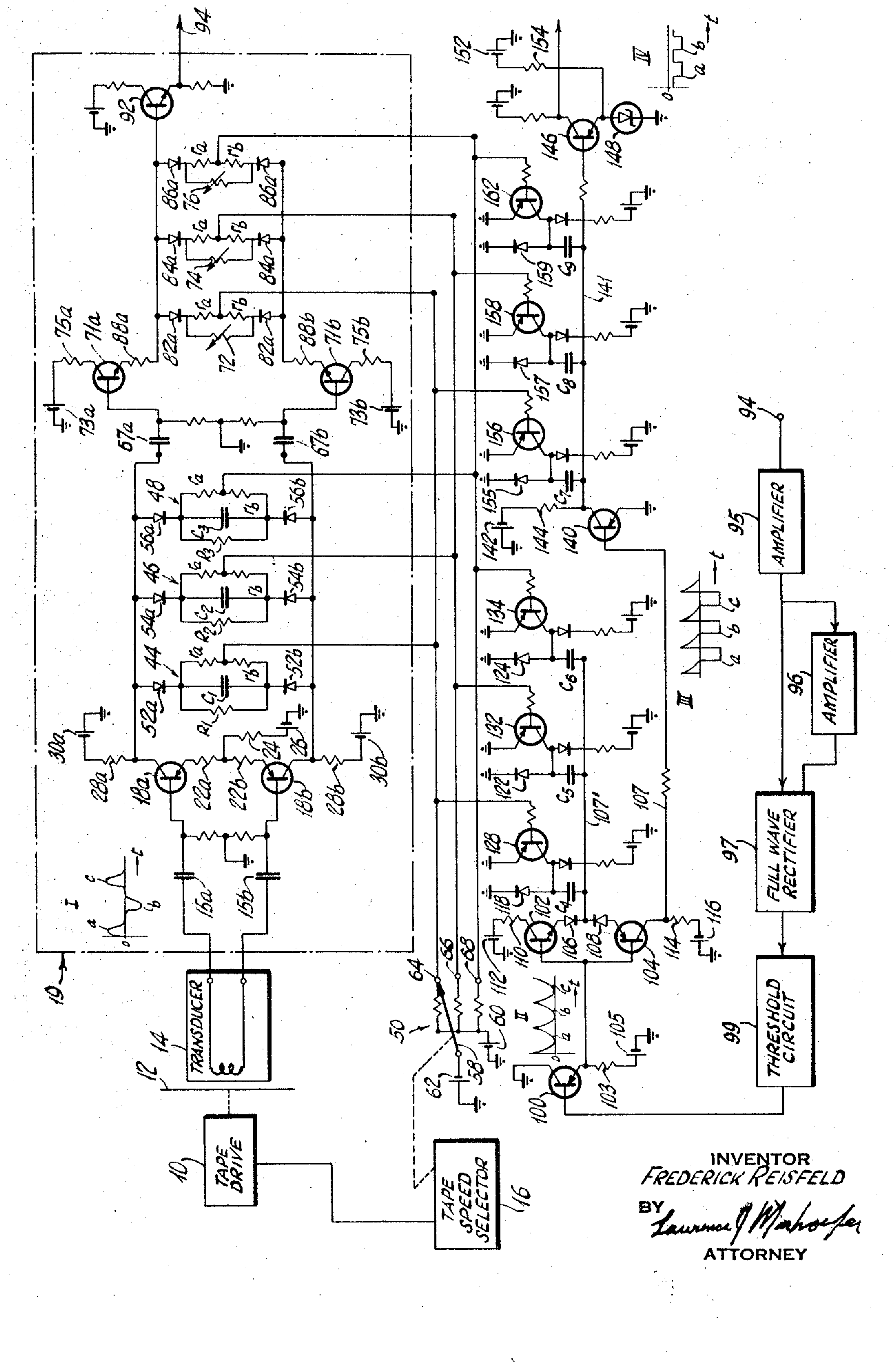
INVENTOR
FREDERICK REISFELD
BY
ATTORNEY United States Patent Office 3,465,321

Patented Sept. 2, 1969

3,465,321

DIFFERENTIAL AMPLIFIER AND PEAK DETECTOR FOR MULTIPLE SPEED MAGNETIC TAPE TRANSPORT

Frederick Reisfeld, Bayside, N.Y., assignor to Potter Instrument Company, Inc., Plainview, N.Y., a corporation of New York Filed Feb. 21, 1966, Ser. No. 529,042

Int. Cl. G11b *5/00*

U.S. Cl. 340—174.1 4 Claims

ABSTRACT OF THE DISCLOSURE

The specification and drawings disclose a differential amplifier and peak detector for a magnetic tape transport which can be operated at any one of several different selectable speeds. For each selectable speed, the gain and band width of the amplifier are adjustable by means of selectable parallel resistance-capacitance networks and the operating frequency of the peak detector is variable to match the frequency of the information signal.

This invention relates to an amplifier and peak detector for use in reading binary information stored on a magnetic medium, and more particularly, to an improved preamplifier and peak detector for use in reading binary information from a magnetic tape which can be driven at any one of a wide range of selectable tape speeds.

Certain tape transports known in the prior art have a wide range of selectable speeds at which the magnetic storage tape may be driven in recording information on the tape or reading information therefrom. The problem in providing an amplifier and peak detector for reading information from such a variable speed tape is that the magnitude and frequency of the transducer output signal are functions of the tape velocity. At tape velocities on the order of 2 inches per second (i.p.s.), the transducer output signal is on the order of a few millivolts and has a fundamental frequency of less than 100 cycles per second (c.p.s.). At tape velocities in excess of 100 i.p.s., the output signal of the same transducer is on the order of tenths of a volt and has a fundamental frequency in excess of 50 kilocycles (kc.). Amplifiers and peak detectors proposed in the prior art to meet these extremely broad-band, high-gain requirements are complex and expensive.

One object of my invention is to provide a simple, economical, preamplifier and peak detector for variable speed tape transports.

Another object of my invention is to provide an improved read amplifier and peak detector for a tape transport having a range of selectable tape speeds extending from 2 i.p.s. to 150 i.p.s.

Still another object of my invention is the provision of simple, economical circuits for adjusting the gain and frequency response of a differential amplifier.

Briefly, this invention contemplates the provision of a differential preamplifier, the gain and bandwidth of which are adjustable by means of selectable parallel resistance-capacitance networks. Signals from the tape speed selection circuitry select one of the R-C networks in order to increase the gain and decrease the bandwidth of the amplifier as lower tape speeds are selected, and, conversely, decrease the gain and increase its bandwidth as higher tape speeds are selected.

In the peak detector, for each selectable speed there is a selectable timing capacitor which is coupled via a transistor switch to the tape speed selection circuitry. The selected capacitor matches the operating frequency of the peak detector to the frequency of the information signal for the selected speed.

Other objects and advantages of the invention will become apparent from the following detailed description of a preferred form of the invention taken in conjunction with the accompanying drawing, wherein the single figure is a schematic view of apparatus for reading information from a magnetic tape, showing a preamplifier and peak detector constructed in accordance with one embodiment of this invention.

Referring now to the drawing, a variable speed tape drive mechanism 10 known in the art drives a magnetic storage tape 12 past a transducer 14 at a constant speed. An output of a tape speed selector 16 coupled to the tape drive 10 is operable to select one of the available tape drive speeds of tape drive 10. Selector 16 may operate manually, or in any other suitable manner known in the are. In the exemplary embodiment shown, three speeds are selectable; 2 i.p.s., 50 i.p.s. and 150 i.p.s. As variable speed tape drive mechanisms, selectors and transducers of the type thus far described are well known in the art, they have been shown here in block diagram form only.

Blocking capacitors 15*a* and 15*b*, respectively, couple the ungrounded output of the transducer 14 to the bases of transistors 18*a* and 18*b*, which comprise a first differential amplifier stage of a preamplifier enclosed in a dotted box indicated generally by the reference numeral 19. The idealized wave form of a typical output of transducer 14 is shown in FIGURE 1, adjacent the transducer, indicated by Roman numeral I. As will be appreciated by those skilled in the art, the preamplifier 19 may employ as many amplifying stages as desired.

The emitters of transistors 18*a* and 18*b* are coupled to gether through resistors 22*a* and 22*b*, which are of equal value. A feedstock resistor 24 couples the common terminal of resistors 22*a* and 22*b* to the positive terminal of a direct current power supply 26, the negative terminal of which is grounded. Collector resistors 28*a* and 28*b*, which are of equal value, respectively couple the collectors of transistors 18*a* and 18*b* to the negative terminals of D.C. power supplies 30*a* and 30*b*, the positive terminals of which are grounded.

The collectors of transistors 18*a* and 18*b* are the terminals from which the output of this amplifying stage is coupled. For changing the gain and frequency response of the preamplifier as the tape speed changes, three parallel resistance-capacitance (R-C) networks, indicated generally by the reference numerals 44, 46 and 48 are coupled between these ungrounded output terminals. Network 44 comprises resistor R1 and capacitor C1; network 46 comprises resistor R2 and capacitor C2; and network 48 comprises resistor R3 and capacitor C3. The resistance of R1 is greater than the resistance of R2 which is greater than the resistance of R3 (R1 R2 R3). The capacitance of C1 is greater than the capacitance of C2 which is greater than the capacitance of C3 (C1 C2 C3).

Back biased diodes 52*a*, 54*a* and 56*a* respectively couple the one terminal of netawork 44, 46 and 48 to the collector at transistor 18*a*. Similarly, back biased diodes 52*b*, 54*b* and 56*b* respectively couple the collector of transistor 18*b* to the other terminal of the networks 44, 46 and 48.

For selecting one of the R-C networks, there is a selector switch, generally indicated by the reference numeral 50, which is coupled to the selector 16. An arm 58 of the switch 50 is coupled to the negative terminal of a power supply 62, the positive terminal of which is grounded. Switch 50 has three output terminals, 64, 66 and 68, one for each selectable tape speed. Current limiting resistors couple the positive terminal of a source of bias potential 60 to the terminals 64, 66 and 68. In the specific embodiment shown, when the slowest tape speed (2 i.p.s.) is selected, selector 16 moves arm 58 into contact with terminal 64; when the intermediate speed is selected (50 i.p.s.), selector 16 moves arm 58 into contact with terminal 66; and when the highest tape speed is selected (150 i.p.s.), arm 58 contacts terminal 68.

Three balanced resistance networks comprising equal valued resistances $r_a$ and $r_b$ respectively couple the potential of terminals 64, 66 and 68 across the R-C networks 44, 46 and 48. The potential of source 62 is sufficiently negative with respect to the potential of the collectors of transistors 18*a* and 18*b* to overcome the positive of source 60 and forwardly bias the diodes 52*a*–52*b*, 54*a*–54*b* or 56*a*–56*b*.

At the lowest tape speed arm 58 contacts terminal 64 and network 44 is coupled between the transistor collectors, providing a high gain, owing to the large value of R1, and a small bandwidth, owing to the large value of C1. At intermediate speeds, arm 58 contacts terminal 66, and network 46 is coupled between the transistor collectors providing an intermediate gain and bandwidth, owing to the intermediate values of R2 and C2. Similarly, when arm 58 contacts terminal 68, the gain of the amplifier stage is small, owing to the small value of R3, and the bandwidth is large owing to the small value of C3.

Blocking capacitors 67*a* and 67*b* respectively couple the collectors of transistors 18*a* and 18*b* to the bases of PNP transistors 71*a* and 71*b*, the collectors of which are respectively coupled to the positive terminals of potential sources 73*a* and 73*b* via resistors 75*a* and 75*b*. Variable resistors 72, 74 and 76, coupled between the emitters of transistors 71*a* and 71*b*, provide an adjustment of the gain of the preamplifier 16 for each selectable speed. Diodes 82*a*, 84*a* and 86*a* couple resistors 72, 74 and 76, respectively, to the emitter of transistor 71*a* through a small emitter resistor 88*a*. Similarly, diodes 82*b*, 84*b* and 86*b* respectively couple resistors 72, 74 and 76 to the emitter of transistor 71*b* through a small fixed emitter resistor 88*b*. Three balanced resistance networks comprising equal value resistors $r_a$ and $r_b$ respectively couple the terminals 64, 66 and 68 across 72, 74 and 76. The positive potential source 60 back biases the diode pairs 82*a*–82*b*, 84*a*–84*b* and 86*a*–86*b*.

When arm 58 contacts terminal 64, source 62 forwardly biases diodes 82*a* and 82*b*, coupling resistor 72 between the emitters of transistors 71*a* and 71*b*. Similarly, when arm 58 contacts terminal 66, source 62 forwardly biases diodes 84*a* and 84*b*, coupling resistor 74 between the transistor emitters. When arm 58 contacts terminal 68, source 62 forwardly biases diodes 86*a* and 86*b*, coupling resistor 76 between the transistor emitters. The output of this stage of the preamplifier is coupled to an output terminal 94 via an impedance matching emitter follower stage comprising NPN transistor 92.

In operation, the resistance of each of the resistors 72, 74 and 76 is adjusted to make the amplitude of the output signal substantially the same for all selected tape speeds.

The wave form of the amplified output signal at terminal 94 is similar to that of the input wave form indicated at Roman numeral I, and is coupled to the input of an amplifier 95. The output of amplifier 95 is inverted by an inverting amplifier 96. Both the output from amplifier 95 and its complement from amplifier 96 are coupled to this input of a full wave rectifier 97, the output of which coupled through a threshold circuit 99 to base of a transistor 100.

Transistor 100 is connected as an emitter follower, with its collector coupled to ground and its emitter coupled through a resistor 103 to a +15 volt potential source 105. The wave form of the output of the emitter follower resembles a full wave rectified sine wave which varies between a +15 volt and ground, as indicated at Roman numeral II. The peaks *a*, *b* and *c* correspond to the flux transition points *a*, *b* and *c* of the input signal indicated at I. Since amplifiers, threshold circuits, and full wave rectifiers are well known in the art, they have been shown here in block diagram form only in order not to obscure the invention.

To detect the peaks *a*, *b* and *c*, the output of amplifier 100 is coupled in parallel to the bases of an NPN transistor 102 and a PNP transistor 104. The emitter of transistor 102 is forwardly coupled through diodes 106 and 108 to the emitter of transistor 104. A resistor 110 couples collector of transistor 102 to the positive terminal of a power supply 112, the negative terminal of which is grounded. A resistor 114 couples the collector of transistor 104 to the negative terminal of a power supply 116, the positive terminal of which is grounded. It should be noted that the resistance of resistor 114 is much greater than that of resistor 110. For example, resistor 114 may be on the order of 15 thousand ohms, while resistor 110 may be less than 100 ohms.

A lead 105 couples one terminal of timing capacitors C4, C5 and C6 to the common junction of diodes 106 and 108. Diodes 118, 122 and 124 respectively couple the other terminals of the capacitors C4, C5 and C6 to ground. PNP transistor switches 128, 132 and 134, the bases of which are coupled to terminals 64, 66 and 68, respectively, shunt diodes 118, 122 and 124, respectively.

When arm 58 engages terminal 64, transistor 128 saturates, selecting capacitor C4 by providing a low impedance path to ground for this capacitor. Similarly, arm 58 contacting terminal 66 selects capacitor C5, and arm 58 contacting terminal 68 selects capacitor C6. It should be noted that the capacitance of capacitor C4 is larger than the capacitance of capacitor C5, which is larger than the capacitance of capacitor C6 (C4 C5 C6).

In the operation of the peak detector, assume capacitor C4 is selected and is positively charged to +15 volts, the potential of source 112. The output of amplifier 100, in the absence of an input signal, is also +15 volts. Transistor 102, therefore conducts and maintains 15 volts on capacitor C4, and transistor 104 is cut off.

The input signal to the peak detector reduces the potential on the bases of transistors 102 and 104 below +15 volts, turning transistor 102 off and transistor 104 on. The collector of transistor 104 is thus coupled to capacitor C4, which discharges toward +15 volts, principally, through the circuit comprising diode 108, the emitter-base impedance of transistor 104, the emitter resistor 103 of transistor 100, and source 105. It should be noted that the time constant for the discharge of capacitor C4 is such that the potential on capacitor C4 changes at approximately the same rate as the input signal.

After the input signal reaches its negative peak at *a* and starts increasing, the potential on the bases of transistors 102 and 104 become positive with respect to their emitters, since capacitor C4 has discharged, turning transistor 102 on and transistor 104 off. The potential on lead 107 drops to −15 volts, and capacitor C4 charges rapidly to +15 volts via resistor 110, transistor 102 and diode 106. Transistor 104 remains cut off until the input signal reaches +15 volts, and the cycle is thereafter repeated.

The output of the peak detector is indicated at Roman numeral III. Lead 107 couples this output from the collector of transistor 104 to the base of PNP transistor 140, the emitter of which is coupled to ground and collector of which is coupled through a resistor 144 to the negative terminal of a power supply 142. Transistor 140 limits the output from the peak detector to a series of negative pulses.

To discriminate against short duration noise spikes in the output of transistor 140, a lead 141 couples the output of this transistor through an interrogation network to the base of a PNP transistor 146, the emitter of which is held at a constant negative potential by a Zener diode 148 which is biased beyond its breakdown potential by a negative potential source 152.

One terminal of three selectable integrating capacitors, C7, C8 and C9, is coupled to lead 141. Respective diodes 155, 157 and 159 couple the other terminals of capacitors C7, C8 and C9 to ground. Transistor switches 156, 158 and 162 select one of the capacitors C7, C8 or C9. The bases of transistor switches, 156, 158 and 162, are coupled through current limiting resistors to terminals 64, 66 and 68, respectively, and operate in the same manner as switches 128, 132 and 140. The capacitance of capacitor C7 is less than the capacitance of capacitor C8 which is less than the capacitance of capacitor C9.

The time constant of the R-C network comprising capacitor C7 and resistor 114 is relatively short (1/10) compared to the pulse repetition rate of the output signal from transistor 140 at a tape speed of 2 i.p.s. Similarly, the time constant of capacitor C8 and resistor 144 is short compared to the output signal of transistor 140 at a tape speed of 75 i.p.s., and the time constant of the R-C network comprising the capacitor C9 and resistor 144 is short compared to the output signal of transistor 140 for a tape speed of 150 i.p.s. Thus, the selected integrating capacitor C7 or C8 or C9 passes the signal pulses from transistor 140 to the base of transistor 146 substantially undistorted, but prevents short duration noise signals from rising above the reference level established by the Zener diodes 148. An output coupled from the collector of transistor 146 is shown at Roman numeral IV.

By way of complete disclosure, but not by way of limitation, certain typical component values are listed in Table I of a preamplifier and peak detector for tape speeds of 2 i.p.s., 50 i.p.s. and 150 i.p.s.

TABLE I

| | Component specification | Value |
|---|---|---|
| Component: | | |
| 18a–18b | PNP transistor | 2N1309. |
| 22a–22b | Resistor | 200 ohms. |
| 24 | do | 4.7K ohms. |
| 28a–28b | do | 4.7K ohms. |
| R1 | do | 47K. |
| C1 | Capacitor | 6,800 pf. |
| R2 | Resistor | 470 ohms. |
| C2 | Capacitor | 1,000 pf. |
| R3 | Resistor | 240. |
| C3 | Capacitor | Zero. |
| 71a–71b | NPN transistor | 2N697. |
| 75a–75b | Resistor | 3.3K. |
| 88a–88b | do | 120 ohms. |
| 72-74-76 | Potentiometer | 10K. |
| 102 | NPN transistor | 2N697. |
| 104 | PNP transistor | 2N1309. |
| 103 | Resistor | 3K. |
| 110 | do | 39 ohms. |
| 114 | do | 15K. |
| C4 | Capacitor | 1 μf. |
| C5 | do | .022 μf. |
| C6 | do | 2,000 pf. |
| 140 | PNP transistor | 2N1309. |
| 144 | Resistor | 3K. |
| C7 | Capacitor | .047 μf. |
| C8 | do | 2,000 pf. |
| C9 | do | 1,000 pf. |

This invention may be variously modified within the scope of the subjoined claims.

What is claimed is:

1. An amplifier and peak detector for producing a binary output signal in response to a signal from a transducer sensing binary information on a magnetic storage medium moving relative to the transducer at one of a plurality of selectable speeds, comprising in combination;
   a differential amplifier having input means and output means,
   means for coupling the transducer signal to said input means,
   a peak detector having input and output means,
   means for coupling said amplifier output means to said peak detector input means,
   first means responsive to the selected speed of said medium for varying the gain and frequency response of said amplifier, and
   second means responsive to the selected speed of said medium for varying the operating frequency of said peak detector.

2. An amplifier and peak detector as in claim 1 wherein said first responsive means includes a plurality of selectable parallel resistance-capacitance networks and means for selecting one of said networks.

3. An amplifier and peak detector as in claim 2 wherein each of said selectable parallel resistance-capacitance networks are coupled by a pair of back-biased diodes across a pair of terminals at a common direct current potential and a differential alternating current potential, and said means for selecting includes means for forwardly biasing the pair of diodes coupling a desired network across said terminals.

4. An amplifier and peak detector as in claim 3 wherein said second responsive means includes a plurality of selectable capacitors.

References Cited

UNITED STATES PATENTS

| | | | |
|---|---|---|---|
| 2,239,042 | 4/1941 | Kleber et al. | 179—100.1 |
| 2,759,049 | 8/1956 | Scott | 179—100.2 |
| 3,327,299 | 6/1967 | Johnson | 340—174.1 |
| 3,339,192 | 8/1967 | Zeller et al. | 340—174.1 |
| 3,349,383 | 10/1967 | Chur | 340—174.1 |
| 3,357,002 | 12/1967 | Smith-Vaniz et al. | 340—174.1 |

BERNARD KONICK, Primary Examiner

V. P. CANNEY, Assistant Examiner